United States Patent
Tyroller

(10) Patent No.: US 9,212,730 B2
(45) Date of Patent: Dec. 15, 2015

(54) TENSIONER FOR A TRACTION DEVICE HAVING AN OVERPRESSURE VALVE WITH A SEALING CAGE, AND TRACTION DEVICE DRIVE HAVING A SUCH TENSIONER

(75) Inventor: Peter Tyroller, Adelschlag (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 64 days.

(21) Appl. No.: 14/004,533

(22) PCT Filed: Jan. 31, 2012

(86) PCT No.: PCT/EP2012/051549
§ 371 (c)(1),
(2), (4) Date: Sep. 11, 2013

(87) PCT Pub. No.: WO2012/130501
PCT Pub. Date: Oct. 4, 2012

(65) Prior Publication Data
US 2013/0345002 A1      Dec. 26, 2013

(30) Foreign Application Priority Data
Mar. 31, 2011   (DE) .......................... 10 2011 006 602

(51) Int. Cl.
*F16H 7/08*      (2006.01)
*F16H 7/22*      (2006.01)

(52) U.S. Cl.
CPC ................ *F16H 7/08* (2013.01); *F16H 7/0836* (2013.01); *F16H 2007/0806* (2013.01); *F16H 2007/0814* (2013.01); *F16H 2007/0859* (2013.01)

(58) Field of Classification Search
CPC ............... F16H 2007/0859; F16H 2007/0806; F16H 2007/0812; F16H 7/0848; F16H 2007/0891

USPC .......................................................... 474/110
See application file for complete search history.

(56) References Cited

U.S. PATENT DOCUMENTS

| 5,860,881 | A  | * | 1/1999  | Tada ............................ 474/110 |
| 5,879,256 | A  | * | 3/1999  | Tada ............................ 474/110 |
| 6,139,454 | A  | * | 10/2000 | Simpson ....................... 474/110 |
| 6,165,090 | A  | * | 12/2000 | Simpson ....................... 474/110 |
| 6,193,623 | B1 | * | 2/2001  | Koch et al. .................... 474/110 |
| 6,322,468 | B1 | * | 11/2001 | Wing et al. ................... 474/110 |

(Continued)

FOREIGN PATENT DOCUMENTS

| DE | 19957527 A1     | 6/2000 |
| DE | 102007057783 A1 | 6/2009 |

(Continued)

*Primary Examiner* — Henry Liu
(74) *Attorney, Agent, or Firm* — Davidson, Davidson & Kappel, LLC

(57) ABSTRACT

A hydraulic tensioner for a traction device (1) having a pressure chamber (2) in a housing (3), into which a medium that transmits pressure can be introduced, having a feed unit (5) having a non-return valve (6) at one end (4) of the pressure chamber and having an overpressure relief device (8) at the other end (7) of the pressure chamber (2), wherein the overpressure relief device (8) includes a closure element (11), a housing body (9) and a cage (10) which is at least partly arranged within the housing body (9) and which forms a stop for the closure element (11) on the side remote from the pressure chamber, wherein the cage (10) at least partly covers an end side of the housing body (9) that is remote from the pressure chamber. The invention also relates to a traction device drive having such a tensioner for a traction device.

7 Claims, 2 Drawing Sheets

(56) References Cited

U.S. PATENT DOCUMENTS

| | | | |
|---|---|---|---|
| 6,361,458 B1* | 3/2002 | Smith | 474/109 |
| 6,383,103 B1* | 5/2002 | Fujimoto et al. | 474/110 |
| 6,398,682 B1* | 6/2002 | Suzuki et al. | 474/110 |
| 6,435,993 B1* | 8/2002 | Tada | 474/110 |
| 8,221,274 B2* | 7/2012 | Sato et al. | 474/110 |
| 2002/0022541 A1* | 2/2002 | Ullein et al. | 474/110 |
| 2003/0216202 A1* | 11/2003 | Emizu et al. | 474/109 |
| 2006/0003859 A1* | 1/2006 | Sato et al. | 474/110 |
| 2006/0089221 A1* | 4/2006 | Hashimoto et al. | 474/110 |
| 2006/0094549 A1* | 5/2006 | Yoshida et al. | 474/110 |
| 2007/0032322 A1* | 2/2007 | Beardmore | 474/110 |
| 2007/0249444 A1* | 10/2007 | Yoshida et al. | 474/110 |
| 2007/0270259 A1* | 11/2007 | Koch | 474/110 |
| 2008/0015069 A1* | 1/2008 | Kroon et al. | 474/110 |
| 2008/0280712 A1* | 11/2008 | Ryouno et al. | 474/110 |
| 2010/0004080 A1* | 1/2010 | He | 474/110 |
| 2010/0093474 A1* | 4/2010 | Onimaru et al. | 474/110 |
| 2011/0263366 A1* | 10/2011 | Botez | 474/110 |
| 2013/0017913 A1* | 1/2013 | Hartmann | 474/110 |
| 2013/0303318 A1* | 11/2013 | Hofmann et al. | 474/110 |

FOREIGN PATENT DOCUMENTS

| | | |
|---|---|---|
| DE | 102007058735 A1 | 6/2009 |
| JP | 2005180484 A | 7/2005 |

* cited by examiner

TENSIONER FOR A TRACTION DEVICE HAVING AN OVERPRESSURE VALVE WITH A SEALING CAGE, AND TRACTION DEVICE DRIVE HAVING A SUCH TENSIONER

The present invention relates to a hydraulic tensioner for traction means, i.e. a traction device, having a pressure chamber in a housing to which a pressure transmission means may be attached, having a feed unit which includes a non-return valve on one end of the pressure chamber and having an overpressure relief device on the other end of the pressure chamber, the overpressure relief device having a closure element, a housing body and a cage which is at least partially situated within the housing body and which forms a stop for the closure element on the side remote from the pressure chamber.

BACKGROUND

Hydraulic tensioning devices which are used, for example, in combustion engine traction means drives, are known from the prior art, for example DE 199 57527 A1.

DE 199 57527 A1 describes a hydraulic tensioning device for chain drives of internal combustion engines having a clamping piston which moves within a cylinder and which delimits a pressure chamber and by means of which the chain is tensioned as a function of the pressure prevailing in the pressure chamber, the tensioning device also having an inflow path which connects the pressure chamber to a hydraulic system and an outflow path connected to the pressure chamber, through which the hydraulic medium may flow out of the pressure chamber against an outflow resistance predefined by the shape of the outflow path. To improve the oscillation behavior and durability of the chain drive, the outflow path in this publication includes a throttle element which is able to move relative to a counterpart; the outflowing hydraulic medium flows through a throttle section delimited by the throttle element and the counterpart, and the throttle element is moved as a function of the pressure prevailing in the pressure chamber in such a way that the outflow resistance increases as the pressure increases.

The previously used hydraulic tensioners for traction means use an overpressure valve at the closure of the pressure chamber to be able to discharge the hydraulic medium if overpressure occurs in the pressure chamber. For this purpose, a closure element is provided therein, which opens in the aforementioned overpressure situation for the purpose of releasing an opening in the housing body. The closure element strikes a cage which is frequently situated within the housing body.

SUMMARY OF THE INVENTION

Unfortunately, it has been observed that, even before the closure element opens, the hydraulic medium between the housing body and the wall of the pressure chamber escapes to the outside at a pressure which is sufficiently high yet is lower than the pressure needed to release the closure element.

It is an object of the present invention to provide a way to solve this problem. A reliable and cost-effective means of preventing leakage in the area of the overpressure discharge device is to be achieved without any additional components such as O rings, sealing disks or additional sealing means on the circumference and without any additional work steps.

The present invention provides that the cage at least partially covers an end side of the housing body remote from the pressure chamber.

The cage is then clamped between a piston encompassing the pressure chamber and the housing body of the overpressure relief device and counteracts a leakage of the hydraulic medium, i.e., the pressure-transmitting medium, to the outside of the tensioner by forming a seal.

Advantageous specific embodiments are claimed in the subclaims and are explained in greater detail in the following.

It is advantageous if the entire end side of the housing body remote from the pressure chamber is covered by the cage. In this way, a particularly large sealing surface is provided, which efficiently prevents leakage.

To prevent leakage particularly reliably, it is also advantageous if a radial extension of the cage is so large that a radial outside of the cage rests against an inside of the pressure chamber, forming a seal.

It is furthermore advantageous if the cage is situated in such a way that it establishes a sealing effect between the housing body and an inside of a piston forming the pressure chamber.

To allow the pressure-transmitting medium under overpressure, such as oil, in particular hydraulic oil or motor oil, to escape from the pressure chamber if necessary, it is advantageous if the closure element closes an outlet of the pressure chamber and releases it when a certain pressure prevails in the pressure chamber.

A sphere as the closure element has proven to be a particularly efficient closure element.

When the sphere is in contact with an overpressure spring which is situated on the side of the pressure chamber remote from the pressure chamber, a reclosure of the outlet is ensured when the overpressure is eliminated or decreases.

If the cage is manufactured from plastic, previously common cage materials may be resorted to, and a sealing effect may be achieved at the same time. It has been found that the cage is particularly durable when manufactured from PA 66.

The present invention also relates to a traction means drive having a tensioner for traction means which is designed as explained above.

BRIEF DESCRIPTION OF THE DRAWINGS

The present invention is explained with the aid of a drawing. An exemplary embodiment which is illustrated with the aid of three figures is shown in the drawing.

DETAILED DESCRIPTION

Figure 1:
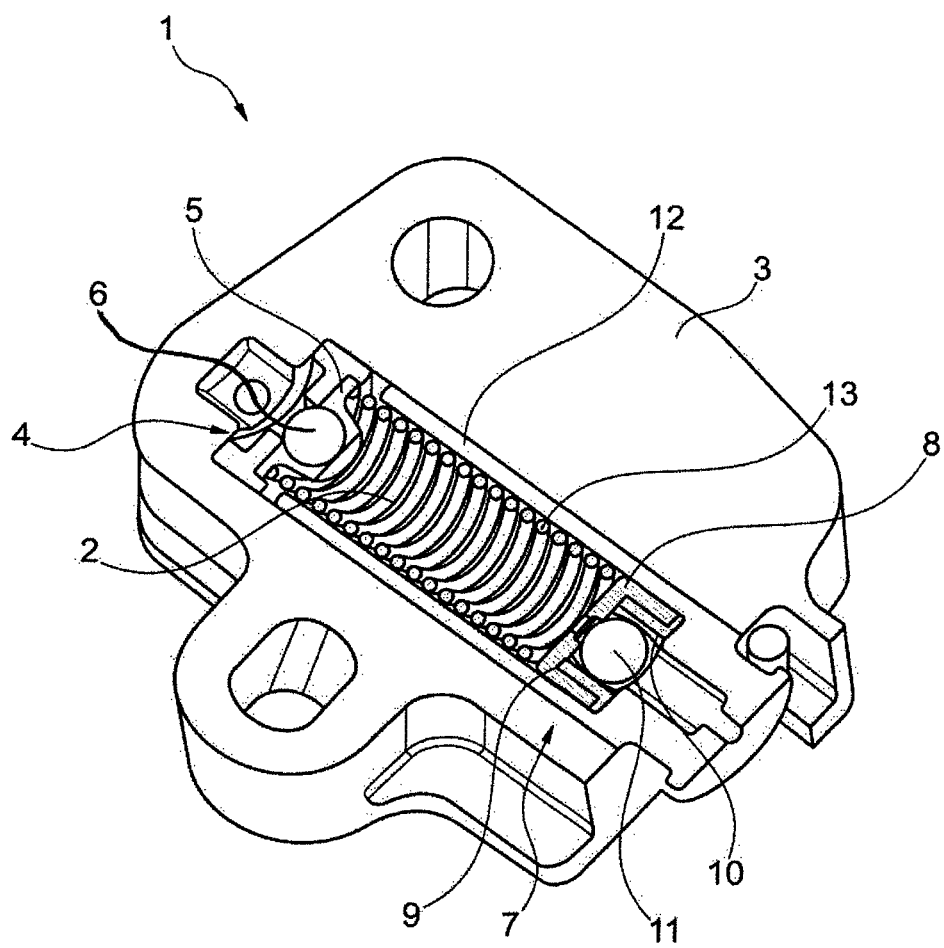
FIG. 1 shows a perspective sectional view of a section of a hydraulic tensioner for traction means according to the present invention.

The figures are only schematic and are used for the sake of understanding the present invention. The same reference numerals are used for the same elements.

FIG. 1 shows a first specific embodiment of a section of a hydraulic tensioner for traction means 1 according to the present invention.

The hydraulic tensioner for traction means has a pressure chamber 2 in a housing 3. A feed unit 5 is situated on a first end of pressure chamber 2, which is marked by reference numeral 4. Feed unit 5 has a non-return valve 6.

Non-return valve 6, which is designed as a sphere, closes an inlet through which a pressure-transmitting medium, such as motor oil, is able to enter the interior of the pressure chamber and is placed under pressure therein.

An overpressure relief device 8 is provided on a second end 7 of pressure chamber 2, which is located opposite feed unit 5. A housing body 9 of overpressure relief device 8 is introduced at second end 7 of pressure chamber 2. A cage 10, which surrounds a closure element 11, is provided radially within housing body 9.

When closure element 11 is in an opened position, it is in contact with cage 10. Cage 10 is manufactured from plastic, in particular PA 66. Similar plastics designed for the same type of stresses may also be used. However, PA 66 has proven to be particularly durable.

Cage 10 rests against an axial flat surface of housing body 9. Cage 10 completely covers the axial flat surface on the side of housing body 9 remote from the pressure chamber, and it is also in contact with an inside of a piston 12 which forms pressure chamber 2.

A first spring 13 is situated inside pressure chamber 2. An overpressure spring, which is not illustrated, is provided on the side of closure element 11 remote from the pressure chamber, which is also designed as a sphere.

Figure 2:
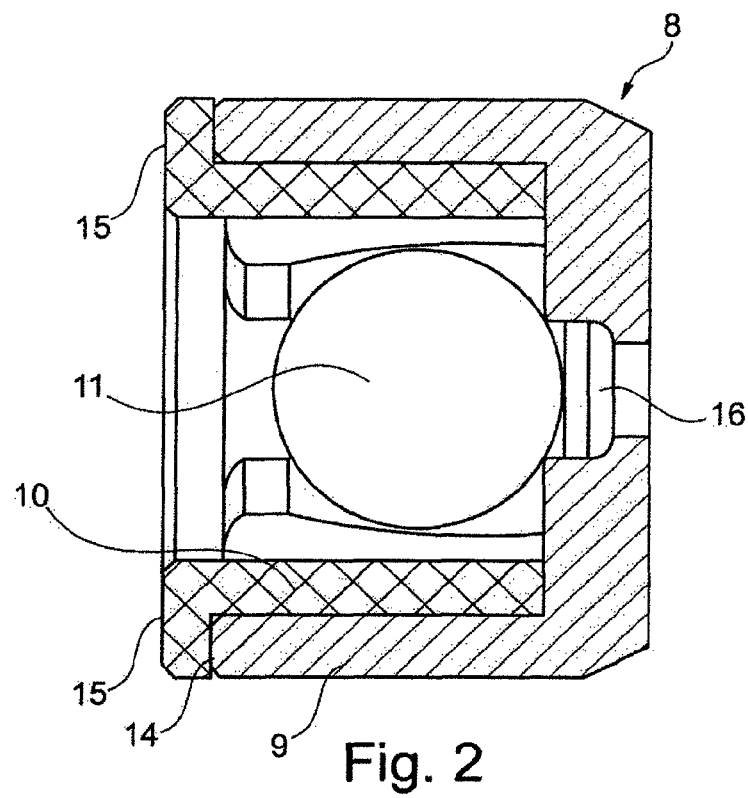
FIG. 2 shows a sectional view of an overpressure relief device extracted from the tensioner for traction means according to the present invention.

FIG. 2 shows an enlarged representation of overpressure relief device 8. The coverage of a flat surface 14 of housing body 9 by a hollow cage 10 holding closure element 11 is clearly illustrated. Flat surface 14 may also be referred to as the end side of the cage remote from the pressure chamber. An area of cage 10 which provides a sealing effect is identified by reference numeral 15. Closure element 11 is shown in a position in which it closes outlet 16.

Figure 3:
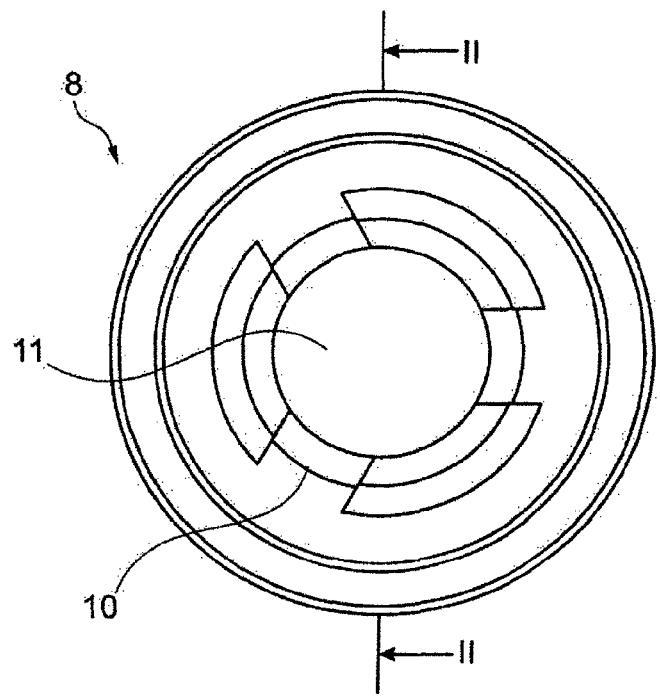
FIG. 3 shows a view of the overpressure relief device from the side remote from the pressure chamber.

FIG. 3 shows a view of the overpressure relief device from the side remote from the pressure chamber.

FIG. 2 shows a sectional view along line II from FIG. 3.

LIST OF REFERENCE NUMERALS

1 Tensioner for traction means
2 Pressure chamber
3 Housing
4 One end
5 Feed unit
6 Non-return valve
7 Other end
8 Overpressure relief device
9 Housing body
10 Cage
11 Closure element
12 Piston
13 First spring
14 Flat surface
15 Area having a sealing effect
16 Outlet

What is claimed is:

1. A hydraulic tensioner for a traction device comprising: a pressure chamber in a housing, a pressure-transmitting medium being introducible into the pressure chamber; a feed unit including a non-return valve on one end of the pressure chamber and an overpressure relief device on the other end of the pressure chamber, the overpressure relief device having a closure element, a housing body and a cage at least partially situated inside the housing body, the cage forming a stop for the closure element on a side remote from the pressure chamber, exclusively the cage covers an entire end side of the housing body remote from the pressure chamber.

2. The tensioner as recited in claim 1 wherein the cage has a radial extension so that a radial outside of the cage rests against an inner surface of the pressure chamber to form a seal.

3. The tensioner as recited in claim 1 wherein the cage seals the housing body and an inside of a piston forming the pressure chamber.

4. The tensioner as recited in claim 1 wherein the closure element closes an outlet of the pressure chamber and releases the outlet when a certain pressure prevails in the pressure chamber.

5. The tensioner as recited in claim 1 wherein the cage is plastic.

6. The tensioner as recited in claim 5 wherein the cage is PA 66.

7. A traction device drive comprising the tensioner as recited in claim 1.

* * * * *